3,349,055
MANUFACTURE OF ELECTROCONDUCTIVE INKS CONTAINING POLYVINYL METHYL - MALEIC ACID COPOLYMERS OR SALTS THEREOF AS ADHESIVE
Akira Taguchi, 20 Mita-Koyama-cho, Shiba, Minato-ku, Tokyo, Japan
Filed Apr. 6, 1965, Ser. No. 446,087
3 Claims. (Cl. 260—29.6)

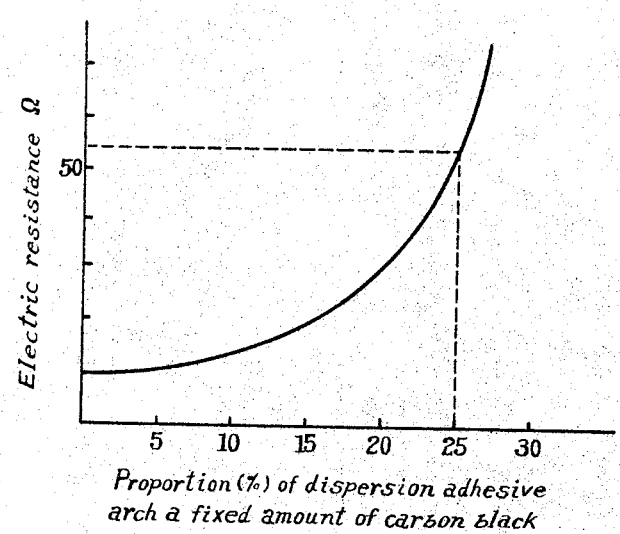
Proportion (%) of dispersion adhesive arch a fixed amount of carbon black United States Patent Office 3,349,055
Patented Oct. 24, 1967

This invention relates to the manufacture of aqueous inks including treatment of carbon black with an aqueous solution including a small proportion of dispersion adhesive such as the half amide of polyvinyl methyl maleic acid copolymer, the ammonium salt thereof, or polyvinyl pyrrolidone. An object of the present invention is to provide a method of making inks which exhibit when transferred to a sheet surface and dried thereon, a satisfactory water proofness and a uniform electroconductivity.

A first requirement for attaining the above object is to use a dispersion adhesive in an amount just sufficient to make possible the effective utilization of the electroconductivity of carbon black. A second requirement is that the ink when transferred to a sheet surface and dried thereon exhibit both good adhesion to the surface and a satisfactory waterproofness. A third requirement is that the suspension of carbon black be stable for a long period of time.

Commercially available carbon black varies in electroconductivity depending upon its method of manufacture and it exhibits a high electroconductivity unless it contains large proportions of ash and oil.

The electrical resistance of carbon black gradually increases with increase in proportion of the dispersion adhesive used in the ink, as graphically illustrated in the accompanying drawing. In other words, the electroconductivity of an ink containing a definite proportion of carbon black gradually decreases with increase in proportion of the dispersion adhesive used in the ink and it finally reduces to zero. Accordingly, in order to satisfy the first requirement pointed out above, the proportion of dispersion adhesive used must be limited to 25% or less of the dry weight of carbon black.

However, if the proportion of dispersion adhesive used is extremely limited relative to the amount of carbon black, the resulting ink exhibits, when transferred to a sheet surface and dried, a deficient adhesion to the surface and an unsatisfactory waterproofness.

Markings made with such ink, which is inferior in adhesion to the sheet surface and in waterproofness, are susceptible to certain external conditions such as friction and water, which may cause dislodgement or separation of carbon particles from the sheet surface. The marking areas thus removed of carbon particles naturally lose their electroconductivity to a substantial extent.

Also, an excessively small amount of dispersion adhesive relative to the carbon black in an ink lacks the capability of protecting the carbon particles therein and thus the latter gradually agglomerate and settle thus reducing its concentration in the ink. This apparently makes it impossible to produce inks having a uniform electroconductivity.

Thus, it has been found that, in order to meet the above second and third requirements, the dispersion adhesive should be used in an amount of 5% or more relative to the dry weight of carbon black.

According to the present invention, a suspension of carbon black which is stable for a long period of time can be produced by use of a dispersion adhesive such as the half amide of polyvinyl methyl maleic acid copolymer, the ammonium salt thereof or polyvinyl pyrrolidone in an amount of from 5% to 25% of the dry weight of carbon black and the stability of the suspension of carbon black can be improved by using in combination with the dispersion adhesive as specified above a carbon black dispersing agent such as the sodium salt of naphthalene sulfonic acid formaldehyde condensation, which is commercially available under the trademark of "Orotan SN."

For a better understanding of the present invention, a few practical examples will now be described.

EXAMPLE 1

Composition: Percent
    Carbon black _____ 5
    Half amide of polyvinyl methyl maleic acid
        copolymer of the ammonium salt thereof __ 0.25
    Glycerine _____ 3
    Preservative _____ 0.3
    "Orotan SN" _____ 0.2
    Water _____ 91.25

*Manufacture*

Five kilograms of water are added to 0.25 kg. of half amide of the polyvinyl methyl maleic acid copolymer and heated to dissolve the low viscosity adhesive. The solution is heated to a boil for 8 to 12 hours and cooled. Then, 5 kg. of commercially available carbon black and 0.2 kg. of "Orotan SN" are added to the solution, which is kneaded in a roll mill to disperse the carbon black. Subsequently, 10 kg. of water is slowly added from above the rolls to make the kneaded mixture pasty. This mixture is then placed in a mixer and further mixed with 3 kg. of glycerine and 6 kg. of 5% water solution of a preservative. The mixed product is diluted with water to form an ink, having a total weight of 100 kg.

EXAMPLE 2

Composition: Percent
    Carbon black _____ 5
    Half amide of polyvinyl methyl maleic acid
        copolymer or the ammonium salt thereof __ 1.25
    Glycerine _____ 4
    Preservative _____ 0.3
    Water _____ 89.45

*Manufacture*

The manufacturing process is substantially the same as that in Example 1 except that "Orotan SN" is not used in this example.

EXAMPLE 3

Composition: Percent
    Carbon black _____ 5
    Polyvinyl pyrrolidone _____ 1
    "Orotan SN" _____ 0.5
    Preservative _____ 0.3
    Glycerine _____ 3
    Water _____ 91.2

*Manufacture*

Five kilograms of water are added to 1 kg. of polyvinyl pyrrolidone and heated to dissolve the latter. To the solution, 5 kg. of commercially available carbon black and 0.5 kg. of "Orotan SN" are admixed. The mixture is worked in a roll mill to disperse the carbon black therein. Subsequently, the procedure is substantially the same as in Example 1.

EXAMPLE 4

Composition:

| | Percent |
|---|---|
| Carbon black | 8 |
| "Orotan SN" | 0.8 |
| Polyvinyl pyrrolidone | 1.2 |
| Glycol | 20 |
| Nonionic surfactant | 1 |
| Preservative | 0.3 |
| Water | 68.7 |

*Manufacture*

Six kilograms of water are added to 1.2 kg. of polyvinyl pyrrolidone and heated to dissolve the latter. To this solution, 8 kg. of commercial carbon black is admixed and dispersed in a roll mill. Then 15 kg. of water is slowly added from above the rolls to make the kneaded mixture pasty, which is then placed in a mixer and mixed therein with 20 kg. of glycol, 1 kg. of nonionic surfactant, 0.3 kg. of preservative and 20 kg. of water. The mixed product is diluted with water to obtain 100 kg. of ink.

EXAMPLE 5

Composition:

| | Percent |
|---|---|
| Carbon black | 8 |
| Half amide of polyvinyl methyl maleic acid copolymer or the ammonium salt thereof | 1.2 |
| "Orotan SN" | 0.8 |
| Glycol | 20 |
| Nonionic surfactant | 1 |
| Preservative | 0.3 |
| Water | 68.7 |

*Manufacture*

Six kilograms of water are added to 1.2 kg. of half amide of polyvinyl methyl maleic acid copolymer and heated to dissolve the low viscosity adhesive. The solution is then heated to a boil for 10 to 15 hours. After it has been cooled, 8 kg. of commercially available oxidized carbon black and 0.8 kg. of "Orotan SN" are admixed. The mixture is worked in a roll mill to disperse the carbon black. The above process is the same as in Example 4.

The dispersion adhesives used in these examples, including the half amide of polyvinyl methyl maleic acid copolymer, the ammonium salt thereof and polyvinyl pyrrolidone have the following structural formulae, respectively, and were used for dispersion of carbon black into a colloid, protection of the colloid and to enable the carbon particles to adhere to the sheet surface.

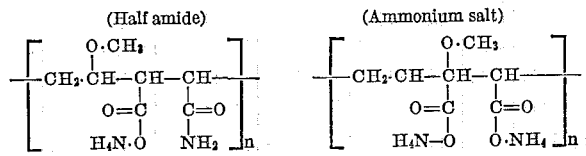

(Half amide)      (Ammonium salt)

Polyvinyl pyrrolidone:

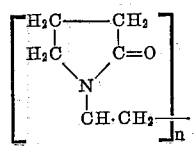

The substance "Orotan SN" is the sodium salt of naphthalene sulfonic acid formaldehyde condensation and is used as carbon black dispersing agent.

Glycerine and glycol are used as drying inhibitor.

The nonionic surfactant is used to impart to the ink an appropriate fluidity and to promote the rate at which the ink is absorbed in paper.

The carbon black used in the method of the invention may be one commercially available and is of high quality including limited percentages of ash, oil and other impurities. Such high quality carbon black may be treated to advantage with an oxidizing agent such as hydrogen peroxide solution or sodium bichromate to obtain oxidized carbon black, which gives a further pronounced electroconductivity to the ink produced.

The ink made by the method of the present invention is a stable suspension of carbon black and has a pH of from 6.0 to 8.5 and is stable even under cooling conditions and can be preserved for a long period of time without impairing its characteristics. This carbon black suspension or electroconductive ink when used to make marks on a sheet surface and when dried exhibits a satisfactory waterproofness closely adhering to the surface to form a uniform and excellent electric conductor.

It is to be understood that the present invention is not restricted to the examples described above but may be performed in many other ways without departing from the scope and spirit of the invention as defined in the appended claims. For instance, the dispersion adhesive used in the invention may alternately take the form of an ammonium salt of styrene maleic acid copolymer, which is expressed by the following structural formula:

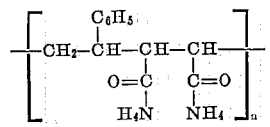

What is claimed is:

1. A method for the manufacture of an aqueous electroconductive ink, said method comprising adding carbon black to an aqueous solution consisting essentially of a dispersion adhesive which is present in an amount between 5 and 25% by weight of the dry weight of carbon black, said dispersion adhesive being selected from the group consisting of the half amide of polyvinyl methyl maleic acid copolymer, and the ammonium salt thereof, adding a carbon black dispersing agent to the aqueous solution to form a mixture, and thoroughly mixing the resulting mixture with a preservative.

2. A method as claimed in claim 1, wherein said carbon black dispersing agent is a sodium salt of naphthalene sulfonic acid formaldehyde condensation.

3. A method as claimed in claim 1 comprising treating the carbon black with an oxidizing agent prior to its addition to said aqueous solution.

References Cited

UNITED STATES PATENTS

| 3,043,784 | 7/1962 | Remer | 106—20 |
| 3,053,779 | 9/1962 | O'Neill | 260—29.6 |

MURRAY TILLMAN, *Primary Examiner.*

GEORGE F. LESMES, *Examiner.*

W. J. BRIGGS, Sr., *Assistant Examiner.*